United States Patent [19]
Jagel et al.

[11] 3,787,071
[45] Jan. 22, 1974

[54] TOWING SKI ATTACHMENT FOR SNOWMOBILES AND METHOD OF USING SAME

[76] Inventors: Edward H. Jagel, 3629 Lippencott, Flint, Mich. 48507; Joseph R. Purzycki, 4396 Eleanor, Linden, Mich. 48451

[22] Filed: May 7, 1971

[21] Appl. No.: 141,132

[52] U.S. Cl. ................................................ 280/28
[51] Int. Cl. .............................................. B62b 17/02
[58] Field of Search ............ 280/28, 11.13 T; 180/5

[56] References Cited
UNITED STATES PATENTS

| | | | |
|---|---|---|---|
| 948,866 | 2/1910 | Mennenga | 280/28 |
| 1,595,632 | 8/1926 | Taft | 280/11.13 T |
| 3,437,354 | 4/1969 | Hetteen | 180/5 R |
| 2,627,442 | 2/1953 | Junker | 180/5 R |
| 3,318,403 | 5/1967 | Hansen | 180/5 R |

FOREIGN PATENTS OR APPLICATIONS

| | | | |
|---|---|---|---|
| 877,718 | 9/1942 | France | 280/11.13 T |

*Primary Examiner*—Kenneth H. Betts
*Assistant Examiner*—John A. Pekar
*Attorney, Agent, or Firm*—Hauke, Gifford & Patalidis

[57] ABSTRACT

A towing ski for attachment to the skis of snowmobiles and similar vehicles designed for travel over snow so as to facilitate the towing of an inoperative snowmobile in a rearward direction. Each towing ski comprises a ski member having a straight portion and a generally upwardly curved forward end. A stop member is carried on the upper face of the ski member and projects toward the rear end thereof. The rear portion of the snowmobile ski is adapted to be fitted onto the straight portion of the ski member with the stop member providing a means for preventing the snowmobile ski from overriding the forward curved end of the towing ski when the snowmobile is being towed rearwardly. Means are provided on the towing ski to prevent lateral movement of the snowmobile ski with respect to the longitudinal axis of the towing ski.

5 Claims, 4 Drawing Figures

PATENTED JAN 22 1974
3,787,071
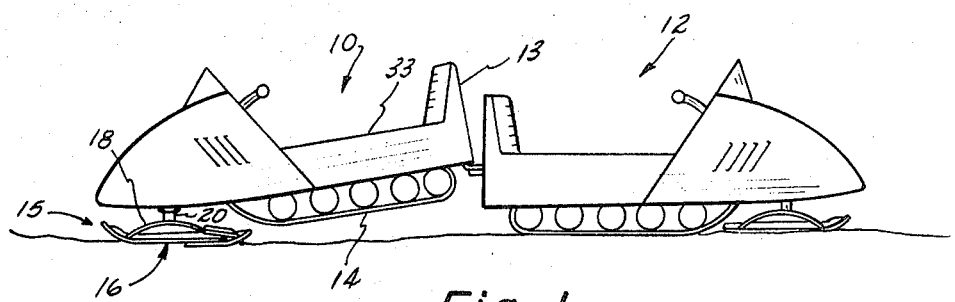
Fig-1
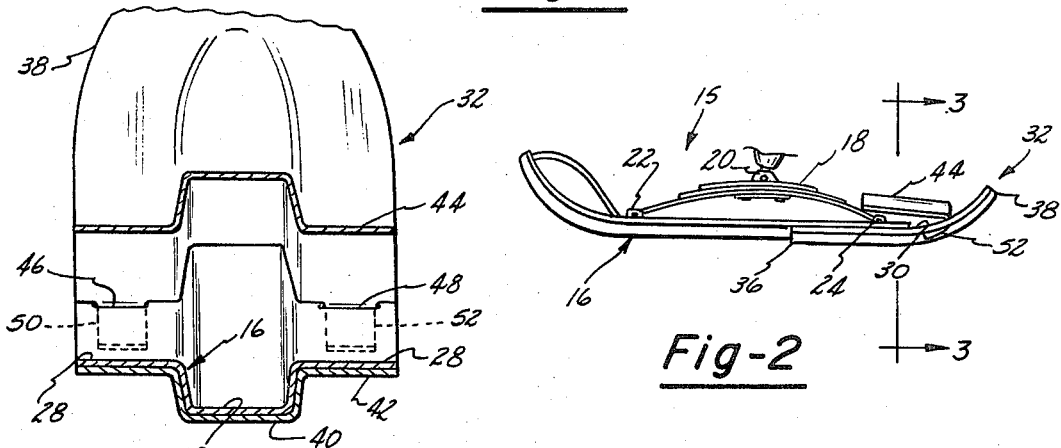
Fig-3
Fig-2
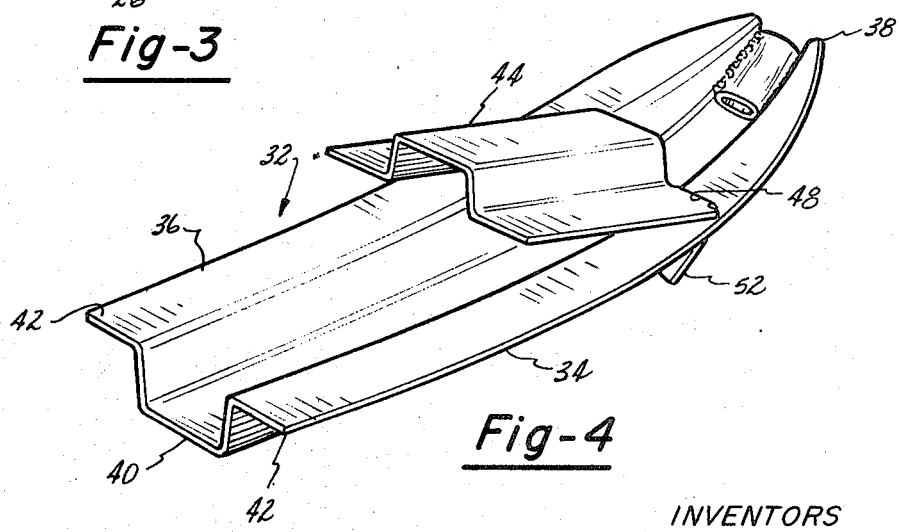
Fig-4
INVENTORS
EDWARD H. JAGEL
&
JOSEPH R. PURZYCKI
BY
Hauke Gifford & Patalidis
Attorneys

TOWING SKI ATTACHMENT FOR SNOWMOBILES AND METHOD OF USING SAME

BACKGROUND OF THE INVENTION

I. Field of the Invention

The present invention relates to vehicles designed for travel over snow and the like and, in particular, to an attachment for snowmobile skis to facilitate the towing of an inoperative snowmobile.

II. Description of the Prior Art

The advent of snowmobiling has opened a new area in the winter recreational field and has evolved into a rapidly expanding industry. One of the problems faced by people using snowmobiles which employ skis of present day design is the towing of the snowmobile when the same becomes inoperative. Normally, the inoperative snowmobile is towed by a second snowmobile in a rear-end to rear-end relationship so that the inoperative snowmobile's driving tracks can be raised above ground level with the forward end to be supported by its steering skis. An often encountered problem with this method of towing is that the rear ends of the skis tend to dig into the snow and this makes the towing of the inoperative snowmobile difficult. Also, substantial damage may be caused to the skis of the snowmobile being towed or its ski suspension system, or possibly the snowmobile towing the inoperative snoWmobile may be damaged because of the increased load imposed upon it.

One solution to the problem which has been suggested is to disassemble the conventional steering skis from the snowmobile and reverse their direction so that the forward upwardly curved ends of the steering skis face in a rearward direction with respect to the inoperative snowmobile. This will enable the towing of the inoperative snowmobile without the danger of steering skis digging into the snow, However, this method is difficult and time consuming in that the ski suspension portion of the snowmobile must be completely disassembled and then reassembled in a reverse manner. This necessitates the carrying of additional tools by the operator of the snowmobile, and requires that the operator have some mechanical knowledge of the assembly and disassembly of the ski suspension portion of the snowmobile. It would, therefore, be desirable to provide a new and easy method and apparatus which permits the towing of the inoperative snowmobile in a rearward direction without the necessity of disassembling and reassembling the existing ski suspension portion of the snowmobile.

SUMMARY OF THE INVENTION

The present invention, which will be described subsequently in greater detail, comprises a towing ski for attachment to the steering axis of an inoperative snowmobile or the like to permit it to be towed in a rearward direction. The towing ski comprises a ski member having a generally straight portion and an upwardly curved rearward end with the upper surface of the ski member being so contoured as to mate with the bottom of the rear portion of the snowmobile steering ski when the same is positioned thereon, so as to prevent the ski from moving laterally with respect to the towing ski. Means are provided for preventing the snowmobile steering ski from overriding the towing ski when the inoperative snowmobile is in tow.

It is therefore an object of the present invention to provide a towing ski attachment for an inoperative snowmobile and the like, which may be readily attached to support the rear portion of a conventional snowmobile ski without the necessity of any fastening elements and without the necessity of disassembling and reassembling the conventional ski suspension portion.

Other objects, advantages, and applications of the present invention will become apparent to those skilled in the art of snowmobiles when the accompanying description of an example of the best mode contemplated for practicing the invention is read in conjunction with the accompanying drawing wherein like reference numerals refer to like parts throughout the several views, and in which:

FIG. 1 is a side elevational view off an inoperative snowmobile in tow and emploYing towing skis constructed in accordance with the principles of the present invention;

FIG. 2 is an enlarged fragmentary side elevational view of the towing ski attached to the conventional snowmobile steering skis illustrated in FIG. 1;

FIG. 3 is a cross-sectional view of the towing ski attached to the snowmobile steering ski and taken along line 3—3 of FIG. 2; and FIG. 4 is an enlarged perspective view of the towing ski illustrated in FIGS. 1-3.

DESCRIPTION OF THE PREFERRED EMBODIMENT

Referring to the drawing and, in particular, to FIGS. 1 and 2, there is illustrated an example of the present invention employed for use in the towing of an inoperative snowmobile 10. The inoperative snowmobile 10 is shown as being towed by a second snowmobile 12 with the rear end 13 of the inoperative snowmobile 10 being raised above the snow a sufficient distance that the driving tracks 14 of the snowmobile 10 are not in contact with the snow. The forward portion of the snowmobile 10 is supported by a standard ski suspension system 15 including a pair of steering skis 16 (only one of which is shown). Each steering ski 16 is provided with a spring mounting member 18 attached to a vertical strut 20. The spring mounting member 18 is usually attached to the steering ski 16 at a front point 22 and a rear point 24, but may be attached in other ways or at other points than those illustrated. The spring mounting member 18 is conventional in its construction and permits the steering ski 16 to flex as it encounters various terrain contours.

As can best be seen in FIG. 3, the cross-sectional shape of the conventional steering ski 16 has a trapezoidal section 26 and a flat ski portion 28 overlying the trapezoidal section 26. The cross-sectional shape of the steering skis produced by different manufacturers may of course differ from the form illustrated herein, however, the steering ski illustrated is of the form presently in common use.

In conventional snowmobile constructions, it is a standard practice to provide two standard width steering skis 16 spaced at the forwardmost edge of the snowmobile 10 with the steering skis 16 being utilized to provide both steering and forward support for the snowmobile 10. Under ordinary snow and terrain conditions, the steering skis 16 function very well, however, as mentioned hereinbefore, if an attempt is made to tow the snowmobile 10 rearwardly, in the manner illustrated in FIG. 1, the rear edges 30 of the conventional snowmobile steering skis 16 tend to dig into the snow and prevent such towing or possibly damaging the steering skis 16, the spring mounting member 18, or the strut 20.

In order to facilitate the easy rearward towing of the inoperative snowmobile 10, towing skis 32 are adapted to be mounted to the rear of the skis 16. Although only one towing ski 32 is illustrated in the drawings, it is to be understood that a pair would be provided, one for each steering ski 16. Each towing ski 32 comprises a ski member 34 having a generally straight forward portion 36 and an upwardly curved tapered rear end portion 38. As can best be seen in FIG. 3, the lower surface of the towing ski 32 is contoured in a manner similar to the conventional snowmobile steering ski 16 in that it has a cross-sectional shape consisting of a trapezoidal section 40 and a flat ski portion 42 overlying the trapezoidal section 40.

When the rear portion of the snowmobile steering ski 16 is positioned on top of the straight front portion 36 of the ski member 34, the bottom face of the snowmobile steering ski 16 mates with the upper face of the ski member 34, that is, the trapezoidal section 26 of the steering ski 16 is disposed within the trapezoidal section 40 on the upper surface of the ski member 34. This mating engagement functions to restrain the snowmobile steering ski 16 from lateral movement with respect to the longitudinal axis of the ski member 34, and thus prevents the snowmobile steering ski 16 from slipping off the towing ski 32 while the inoperative snowmobile 10 is being towed. In those steering ski constructions in which the underlying surface of the steering ski is not of a trapezoidal cross-section, suitable means, such as a ridge along the outer periphery of the ski member 34 of the towing ski 32, may be provided to restrain the steering ski 16 from lateral movement with respect to the longitudinal axis of the ski member 34.

The rear portion 30 of each of the snowmobile steering skis 16 is prevented from moving forwardly and overriding the forward portion 38 of the towing skis 32 by means of a stop member 44 carried by each of the ski members 34. The stop members 44 project slightly upwardly and forwardly toward the front portion 36 of the ski member 34 and thus as the inoperative snowmobile 10 is towed the rear portions 30 of the conventional steering skis 16 or the backside of the spring mounting member 18 will move into abutment with the stop members 44 to drive the towing skis 32. It can thus be seen that each of the steering skis 16 is restrained from both lateral movement and rearward movement with respect to the longitudinal axis of the ski member 34 and the inoperative snowmobile 10 may be towed rearwardly without the difficulties of the conventional snowmobile steering skis 16 digging into the snow.

As can best be seen in FIG. 4, the stop member 44 has a configuration similar to the ski member 34 and thus may be formed during the same stamping operation in which the ski members 34 are formed, however, the cross-sectional configuration of the stop member 44 may take other forms so as to accommodate the backside of the other spring mounting members having different constructions than the member 18. The flat ski portion 42 of the ski member 34 is provided with a pair of spaced, transversely disposed slots 46 and 48 which respectively receive a pair of flanges 50 and 52 formed at the end of the stop member 44. The flanges 50 and 52 are bent toward the front end of the ski member 34 to secure the stop member 44 thereto. When the snowmobile 10 is being towed, the rear end 30 of each steering ski 16 and/or the spring mounting member 18 will tned to be shifted toward the curved end 38 of its associated towing ski and into engagement with the stop member 44. Due to the aforementioned manner of mounting the stop member 44, the same will pivot upwardly until the upper faces of the flanges 50 and 52 abut the bottom of the flat ski portions 42. Thus, a very simple means is provided for securing the stop member 44 to the ski member 34, while providing for a slight pivotal motion to the stop member 44 so as to accomodate various sized steering skis.

The towing skis 32 when not in use may be stored in a storage compartment within the snowmobile 10, as for example under the snowmobile seat 33. The towing skis 32 each have a configuration and width similar to the conventional snowmobile steering skis and thus will serve to support the snowmobile steering skis 16 and the snowmobile in the same positive manner as the steering skis 16 function when the snowmobile 10 is propelled forwardly in a normal manner.

It can thus be seen that the present invention has provided a new and improved towing ski for attachment to snowmobiles and other vehicles of similar design adapted to traverse snow and the like, which towing ski permits the snowmobile or vehicle to be towed rearwardly without the difficulty of the conventional steering skis being damaged or otherwise substantially retarding the towing of such snowmobile and/or vehicles.

It should also be observed that one of the advantages of the present invention is the ease of attachment and removal of the towing skis as attachment occurs simply upon placing the conventional steering skis themselves onto the towing ski without requiring any modification to the steering skis or any other mechanical fastening means.

It should also be noted that although one form of the present invention has been disclosed it is to be understood that other forms and modifications may be had which come within the spirit of the invention and the scope of the appended claims.

What is claimed is as follows:

1. A towing ski for attachment to the skis of vehicles of the type designed to travel over snow for permitting the towing of the vehicle in a rearward direction, said towing ski comprising:
    a ski member having a rear, straight portion, a generally upwardly formed end, and laterally spaced slots;
    a stop member, projecting toward the rear of said ski member in a manner such that the axial movement toward the forward end of said towing ski of said vehicle ski is restrained during the towing operation, and including laterally spaced flanges which register with the slots in the ski member and which are bent toward the rear of said ski member, to allow the stop member to be manually attached to and detached from the ski member.

2. A towing ski for attachment to the skis of vehicles of the type design to travel over snow for permitting the vehicle to be towed in a rearward direction, said vehicle ski comprising a straight portion of generally T-shaped cross section and a generally upwardly curved forward end, said towing ski comprising a ski member having a straight portion and a generally upwardly curved end, means formed on the upper face of said towing ski for removably attaching said towing ski to said vehicle ski beneath said vehicle ski such that the straight portion of the vehicle ski is carried by the straight portion of the towing ski with the curved portion of the towing ski facing to the rear of said vehicle to permit towing of said vehicle in a rearward direction, said attaching means comprising means forming a pocket for receiving said vehicle ski in a longitudinal direction from the rear toward the front of said vehicle ski while permitting removal of said towing ski without interference in a longitudinal direction from the front of said vehicle ski toward the rear thereof, said attaching means further comprising a stop member carried by the upper face of said member and attachable to and detachable from said member, said stop member projecting toward the rear end of said ski member, said rear portion of said vehicle ski being positioned on said ski member, and below said stop member in such a manner that movement of said vehicle ski toward the forward end of said ski member is restrained by said stop member, said ski member having a pair of laterally spaced slots, said stop member having a pair of laterally spaced flanges respectively extending into said spaced slots to secure said stop member on said ski member.

3. A towing ski for attachment to the skis of vehicles of the type design to travel over snow for permitting the vehicle to be towed in a rearward direction, said vehicle ski comprising a straight portion of generally T-shaped cross section and a generally upwardly curved forward end, said towing ski comprising a ski member having a straight portion and a generally upwardly curved end, means formed on the upper face of said towing ski for removably attaching said towing ski to said vehicle ski beneath said vehicle ski such that the straight portion of the vehicle ski is carried by the straight portion of the towing ski with the curved portion of the facing to the rear of said vehicle to permit towing of said vehicle in a rearward direction, said attaching means comprising means forming a pocket for receiving said vehicle ski in a longitudinal direction from the rear toward the front of said vehicle ski while permitting removal of said towing ski without interference in a longitudinal direction from the front of said vehicle ski toward the rear thereof, the upper face of said ski member being formed with a flanged cross section to fit the contour of the vehicle ski whereby said towing ski is restrained from lateral movement with respect to the longitudinal axis of said vehicle ski.

4. A towing ski for attachment to the skis of vehicles of the type designed to travel over snow for permitting the vehicle to be towed in a rearward direction, said vehicle ski comprising a straight portion of generally T-shaped cross section and a generally upwardly curved forward end, said towing ski comprising a ski member having a straight portion and a generally upwardly curved end, means formed on the upper face of said towing ski for removably attaching said towing ski to said vehicle ski beneath said vehicle ski such that the straight portion of the vehicle ski is carried by the straight portion of the towing ski with the curved portion of the towing ski facing to the rear of said vehicle to permit towing of said vehicle in a rearward direction, said attaching means comprising a pocket formed on the upper surface of said towing ski, said pocket extending longitudinally with respect to said towing ski and having an opening facing the rear of said towing ski whereby said vehicle ski is receivable in said pocket in a longitudinal direction from the rear toward the front of said vehicle ski and is removable by relative movement in a longitudinal direction from the front of said vehicle ski toward the rear thereof.

5. The towing ski defined in claim 1 wherein said attaching means further comprises a stop member carried by the upper face of said member, and attachable to detachable from said member, said stop member projecting toward the rear end of said ski member, said rear portion of said vehicle ski being positioned on said ski member and below said stop member in such a manner that movement of said vehicle ski toward the forward end of said ski member is restrained by said stop member.

* * * * *